(12) United States Patent
Burton

(10) Patent No.: US 7,963,715 B2
(45) Date of Patent: Jun. 21, 2011

(54) PUSH-IN CONNECTOR

(75) Inventor: John Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

(21) Appl. No.: 12/114,591

(22) Filed: May 2, 2008

(65) Prior Publication Data

US 2009/0257819 A1    Oct. 15, 2009

Related U.S. Application Data

(63) Continuation-in-part of application No. 12/100,607, filed on Apr. 10, 2008, now Pat. No. 7,845,837.

(51) Int. Cl.
*F21V 14/04* (2006.01)
*F16C 23/00* (2006.01)

(52) U.S. Cl. ........................................ 403/135; 362/515

(58) Field of Classification Search .................. 403/122, 403/135, 141, 143, 56, 96, 149; 362/515, 362/528
See application file for complete search history.

(56) References Cited

U.S. PATENT DOCUMENTS

| | | | | |
|---|---|---|---|---|
| 3,006,673 A * | 10/1961 | Grant | ............................ | 403/122 |
| 3,139,768 A * | 7/1964 | Biesecker | .................... | 74/502.4 |
| 3,173,266 A * | 3/1965 | Shutt | ............................. | 92/169.1 |
| 3,483,888 A * | 12/1969 | Wurzel | ......................... | 137/539 |
| 4,194,850 A * | 3/1980 | Cranmore | .................... | 403/140 |
| 4,503,486 A * | 3/1985 | Makita | .......................... | 362/515 |
| 4,689,725 A | 8/1987 | Saijo et al. | | |
| 5,045,987 A * | 9/1991 | Hebert | .......................... | 362/421 |
| 5,095,411 A | 3/1992 | Peck et al. | | |
| 5,186,531 A | 2/1993 | Ryder et al. | | |
| 5,186,532 A | 2/1993 | Ryder et al. | | |
| 5,360,282 A | 11/1994 | Nagengast et al. | | |
| 5,444,603 A * | 8/1995 | Otsuka et al. | ................. | 362/549 |
| 5,673,992 A | 10/1997 | Schmitt | | |
| 5,707,133 A | 1/1998 | Burton | | |
| 5,833,347 A * | 11/1998 | Nakamura et al. | ............ | 362/507 |
| 6,113,301 A | 9/2000 | Burton | | |
| 6,231,223 B1 * | 5/2001 | Zucar et al. | ................... | 362/528 |
| 6,247,868 B1 | 6/2001 | Burton | | |
| 6,485,218 B1 * | 11/2002 | Martinovsky | ................ | 403/135 |
| 6,612,796 B2 | 9/2003 | Gattone | | |
| 6,692,176 B1 | 2/2004 | Fladhammer | | |
| 6,758,622 B2 | 7/2004 | Burton | | |
| 6,783,314 B2 * | 8/2004 | Gattone | ........................ | 411/533 |

(Continued)

OTHER PUBLICATIONS

Valeo; drawing of Valeo socket; in production circa 2006.
Burton; drawing of Burton Technologies socket; circa 2005.
Tinnerman, photos of standard cap nut fasteners, sold prior to 2007.

*Primary Examiner* — Joshua T Kennedy
(74) *Attorney, Agent, or Firm* — Jennifer R. Racine; Godfrey & Kahn, S.C.

(57) ABSTRACT

A push-in connector provides for easy manufacturing and assembly using a flat-stamped flexible retainer clip. The retainer clip is inserted into the connector and flexes to snap-fit within in the connector. The flex of the clip also flexes wings of the clip which engage with a receiving boss. The flexion of the clip allows for easy push-in of the connector and sufficient resistance to accidental pull-out. The push-in connector design eliminates the need for screw-mounting of the connector. The connector assembly may be manufactured for use in connection with a variety of ball studs, as well as other items such as shafts of various objects and wires, or may be used a fastener.

13 Claims, 18 Drawing Sheets

U.S. PATENT DOCUMENTS

| | | | |
|---|---|---|---|
| 6,813,991 B2 * | 11/2004 | Koth | 92/187 |
| 6,837,716 B1 * | 1/2005 | Brazas | 439/8 |
| 6,945,682 B2 * | 9/2005 | Cramer et al. | 362/528 |
| 6,976,773 B2 * | 12/2005 | Cavanna | 362/515 |
| 7,047,868 B2 * | 5/2006 | Nolan et al. | 92/187 |
| 2008/0138151 A1 * | 6/2008 | Schilz et al. | 403/141 |

* cited by examiner

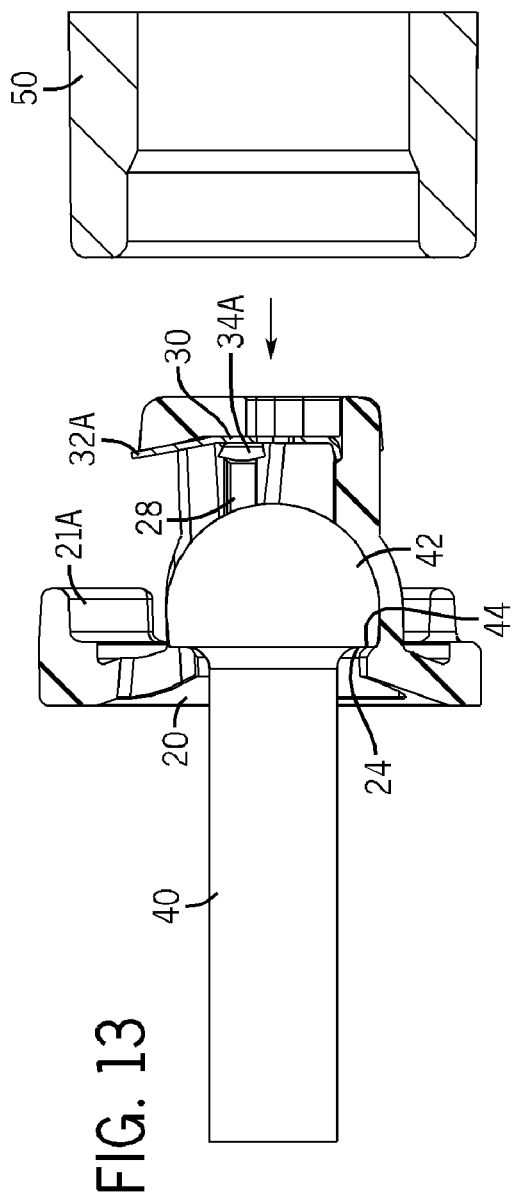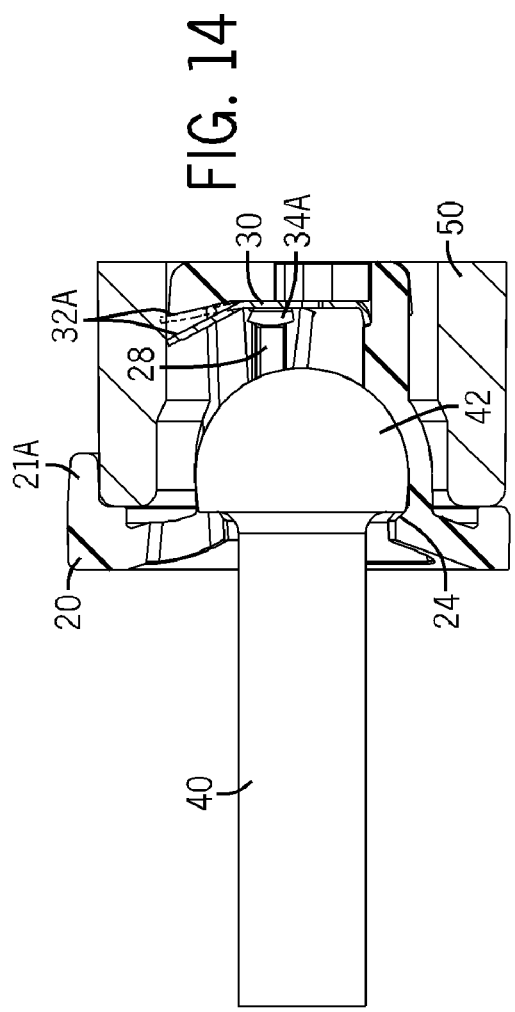

ly, the sockets are attached to the reflector such that movement of the ball stud effectuates movement of the reflector. For example, the socket is attached to a boss with a fastener, the boss having an aperture therein for receiving the fastener. Conventional sockets are secured to the reflector of the headlamp by either screwing the socket into the reflector by placing a screw through a screw hole in the reflector, like that in U.S. Pat. No. 6,247,868, or can be pushed into a through hole in the reflector and secured using tabs or panels which spring outward and "snap-fit" into the reflector hole, like that shown in U.S. Pat. No. 6,837,716. Another conventional socket like that shown in U.S. Pat. No. 6,231,223 is pushed into a blind hole and uses deformable fins to hold the socket inside by friction.

PUSH-IN CONNECTOR

CROSS REFERENCE TO RELATED APPLICATION

This application is a continuation-in-part of U.S. application Ser. No. 12/100,607, filed on Apr. 10, 2008 now U.S. Pat. No. 7,845,837, which is specifically incorporated herein by reference for all purposes. This application claims the benefit of U.S. application Ser. No. 12/100,607 under 35 U.S.C. §120.

BACKGROUND OF THE INVENTION

This invention relates generally to connectors, and in particular to a connector which fits into a boss for uses such as connecting headlamp adjustors to a reflector inside a headlamp assembly, securing wiring, such as wiring running through the interior or engine compartment of an automobile, or many other applications where a cost-efficient, easily installed connector is needed to support or secure an object in place. The improved push-in connector can be used effectively with many types of ball studs, with various items that include a shaft portion, or for securing one or more wires or other objects in place.

Pivotable spherical joints, commonly referred to as ball joints, include a ball stud engaged in a socket. Such joints have a wide variety of applications where a pivotable connection between two parts is desirable. For example, they may be used in many types of linear actuators and have been found to be particularly useful in automotive lamp assemblies. As seen in U.S. Pat. No. 5,707,133, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. The reflector mounts inside the housing on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Another type of automotive headlamp assembly that uses linear actuators is shown in U.S. Pat. No. 5,360,282.

As is known in the art, ball studs interface with a socket, typically plastic, such as the one shown in U.S. Pat. No. 6,837,716. Generally, the sockets are attached to the reflector such that movement of the ball stud effectuates movement of the reflector. For example, the socket is attached to a boss with a fastener, the boss having an aperture therein for receiving the fastener. Conventional sockets are secured to the reflector of the headlamp by either screwing the socket into the reflector by placing a screw through a screw hole in the reflector, like that in U.S. Pat. No. 6,247,868, or can be pushed into a through hole in the reflector and secured using tabs or panels which spring outward and "snap-fit" into the reflector hole, like that shown in U.S. Pat. No. 6,837,716. Another conventional socket like that shown in U.S. Pat. No. 6,231,223 is pushed into a blind hole and uses deformable fins to hold the socket inside by friction.

While one possible application of the present invention is in headlamp assemblies, other applications are possible and references to use in a headlamp assembly should not be deemed to limit the application of the present invention. Connectors such as that contemplated in the present invention could be used in many applications where a boss is provided, such as securing a shaft of an object in place or securing wiring in place. Such uses may be in fields including, but not limited to, automotive, aerospace, large electronics, or in various other applications.

Several problems exist with installation of conventional connectors. For those requiring that the connector be screwed in, an additional assembly task is required by the manufacturer to place the screw into the connector, and, in the example of a headlamp assembly, each socket must be individually screwed into each reflector during assembly. This requires extra time and cost in both manufacturing and installation. Conventional snap-in connectors also have a disadvantage in that a through hole is required for the snap fit fingers to work. Snap fit designs do not work in blind holes since a ledge inside the hole is needed for the snap feature. However, blind holes are often preferred over through holes for ease of manufacturing and tool design and maintenance. Through holes require the reflector molding tool to have a parting line surface within the through hole and often require the use of tool side action as well in order to mold the reflector. This adds complexity and cost to the tool design and construction. Also, added tool maintenance and quality control expense of the parting line surface is needed to prevent flash. Prior connector designs that are pushed into blind holes either have inadequate retention to prevent accidental pull out or require a very high force to install into the hole.

Accordingly, the need exists for a connector which can be inserted into a blind hole. A need also exists for a connector which can be inserted into a boss fairly easily by hand without the extra force of a tool. A need also exists for a connector that resists accidental pull-out from the boss. It is also desirable that such a connector be easily and cost-effectively manufactured and installed, and also that it can be used with any number of different types and sizes of ball studs, shafts, wiring, or other objects.

SUMMARY OF THE INVENTION

The present invention provides a push-in connector that is cost-effective, easy to assemble, easily installed in a boss, can securely retain various types of objects therein, and can be installed into a blind hole. In accordance with the present invention, a push-in connector assembly is disclosed. The connector can be used with various types of ball studs, shafts, wiring or other objects, or can be used a fastener.

In a preferred embodiment, the connector is shaped to allow insertion of a retainer clip through the top portion and chamber of the connector. A plurality of legs connects the top portion of the connector to the bottom portion. The legs may include molded ledges which secure the retainer clip into the connector. The bottom portion of the connector is shaped to receive the retainer clip and to fit into a boss or aperture, such as a boss of a reflector in a headlamp assembly.

In a preferred embodiment, a flat-stamped symmetrical retainer clip is fit into a connector. As the clip is fully seated into the to the connector using hardened steel pins, the inner tabs on the clip bend into a more vertical position and hook behind ledges molded on the inner walls of the connector legs. At this point the outer wings are seated against a concave support base which causes the outer wings of the clip to flex into a more angled position relative to the original flat clip position. The flexion of the outer wings of the retainer clip when inserted into the connector and further flexion upon installation of the connector into the boss allows the connector assembly to be inserted into the boss with relatively small push-in force, and provides the option of hand assembly. Further, accidental removal of the connector from the boss is prevented.

While one possible application of the present invention is in headlamp assemblies, many other applications are possible and references to use in a headlamp assembly should not be deemed to limit the uses of the present invention. The terms "clip," "tab," "wing," "notch" or "ledge" as used herein should not be interpreted as being limited to specific forms or shapes of retainer clips or connectors, or portions thereof. Rather, the connector, ball stud, retainer clip, and ledges of the connector, and tabs, wings and notches of the retainer clip in accordance with the present invention may have a wide variety of shapes. These and other objects and advantages of the present invention will become apparent from the detailed description and accompanying drawings.

BRIEF DESCRIPTION OF THE DRAWINGS

FIG. 13 is an exploded side view of a retainer clip, a connector and a ball stud for assembly into a reflector in accordance with one embodiment of the present invention;

FIG. 14 is a side view of a push-in connector assembly in accordance with one embodiment of the present invention;

DETAILED DESCRIPTION

Figure 1:
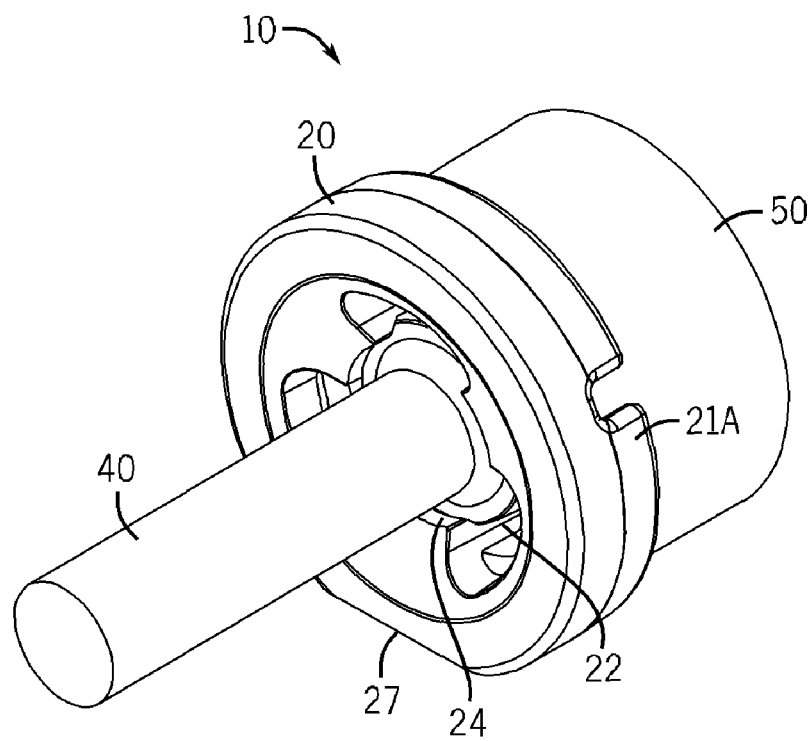
FIG. 1 is a front perspective view of a push-in connector assembly in accordance with one embodiment of the present invention.
Figure 2:
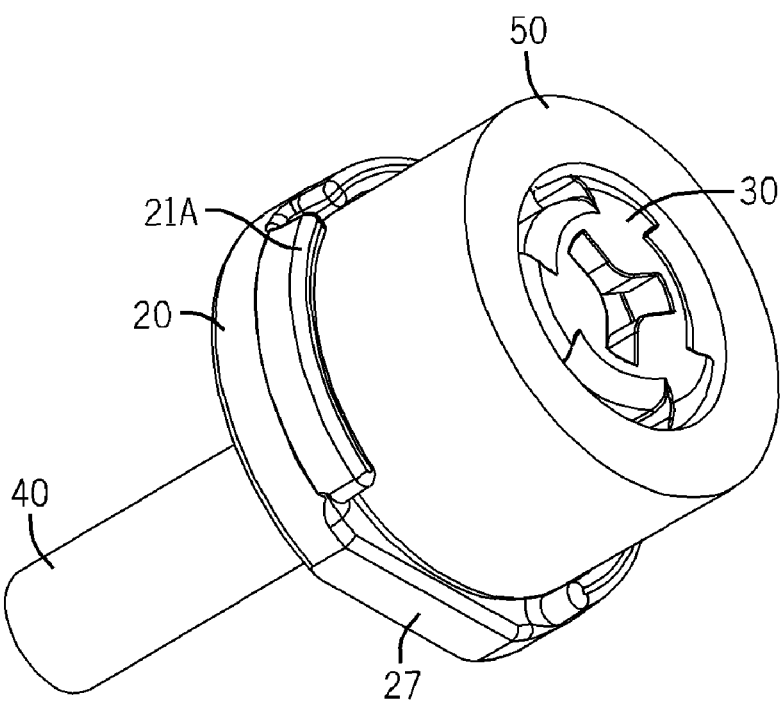
FIG. 2 is a rear perspective view of a push-in connector assembly in accordance with one embodiment of the present invention.

Certain embodiments of a push-in connector assembly 10 in accordance with the present invention are shown in the FIGURES. While the invention may be susceptible to embodiment in different forms, there is shown in the drawings, and herein will be described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

One embodiment of an improved push-in connector assembly 10 is shown in FIGS. 1-14. The assembly 10 consists of a connector 20 and a retainer clip 30. The embodiment shown in FIGS. 1-14 can be used with conventional ball studs of various shapes or disengageable ball studs. In the embodiment shown in FIGS. 1-14, a semi-spherical ball stud 40 with a lip 44 on the head 42 of the ball stud 40 is used, but top portion of connector 21 could be easily modified to accept various types of ball studs known to those skilled in the art, such as spherical, disengageable, or "eared" ball studs. In the embodiment shown in the FIGS. 1-14, connector 20 retains ball stud 40 therein by providing undercut portions 24 which engage or "snap-fit" with the lip 44 on ball stud 40 and secures the head 42 of ball stud 40 by snap-fitting into connector 20. The diameter of undercut portion 24 is smaller than the diameter of the lip 44 of the ball stud head 42. Thus, ball stud 40 cannot be easily dislodged or separated from connector 20, but is still allowed to rotate inside chamber 22 because chamber 22 is slightly larger than the head 42. Ball stud 40 is shown in detail in FIG. 3A and, in this embodiment of a ball stud 40, the lip 44 is formed by a straight portion 43 extending past the curved ball stud head 42.

Figure 1A:
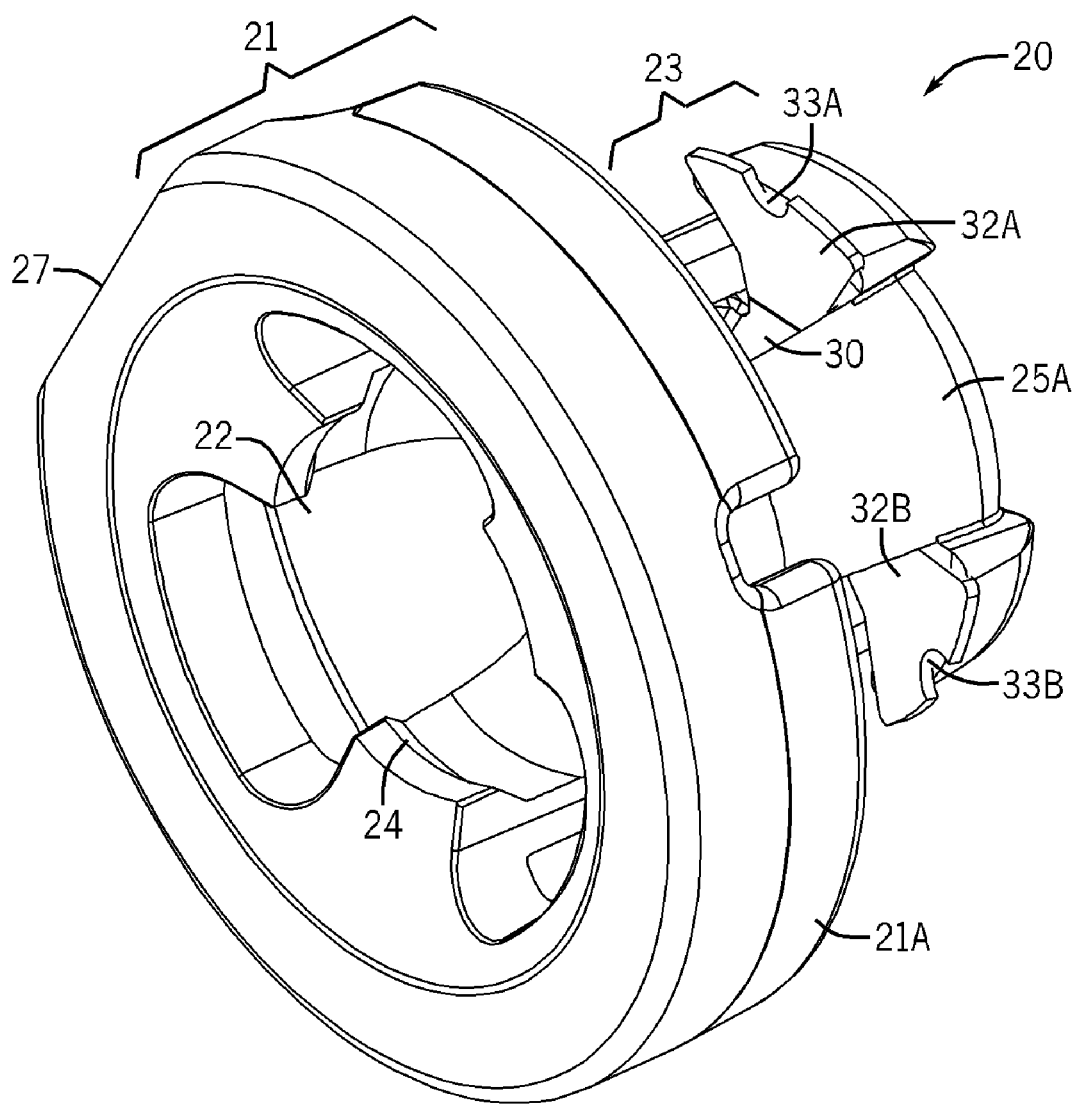
FIG. 1A is a front perspective view of a push-in connector assembly in accordance with one embodiment of the present invention.
Figure 2A:
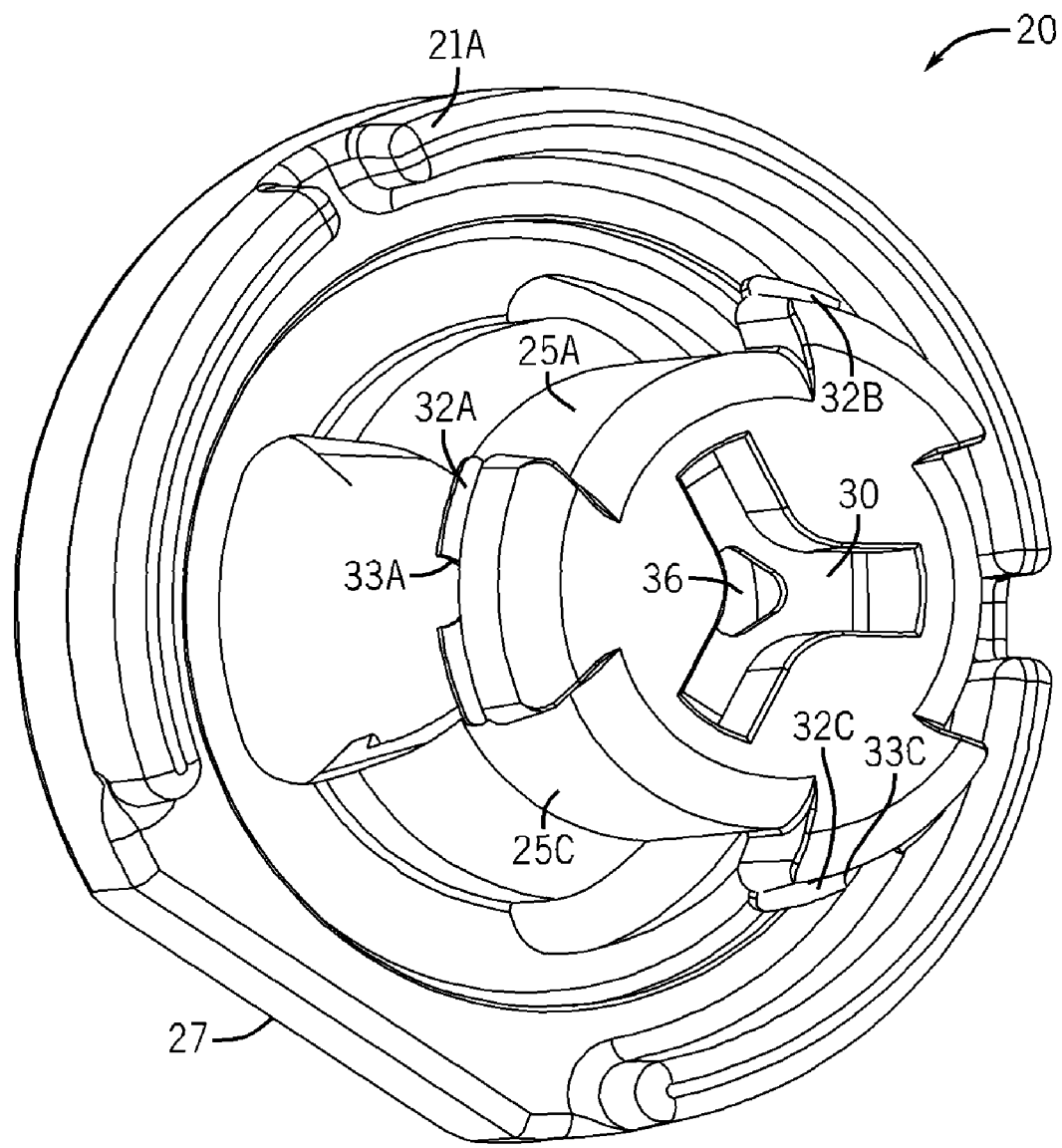
FIG. 2A is a rear perspective view of a push-in connector assembly in accordance with one embodiment of the present invention.
Figure 3:
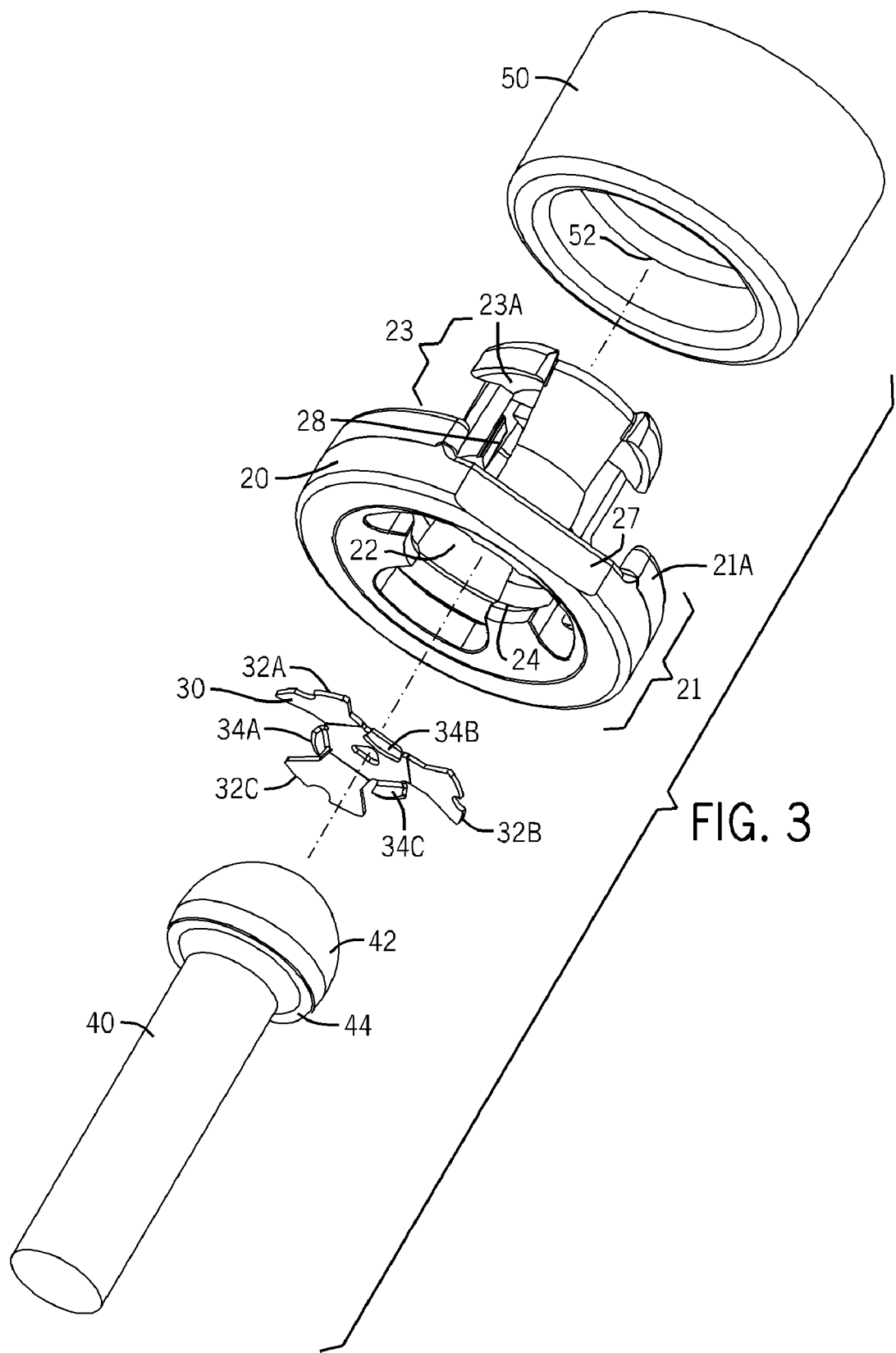
FIG. 3 is an exploded perspective view of a push-in connector assembly in accordance with one embodiment of the present invention.
Figure 10:
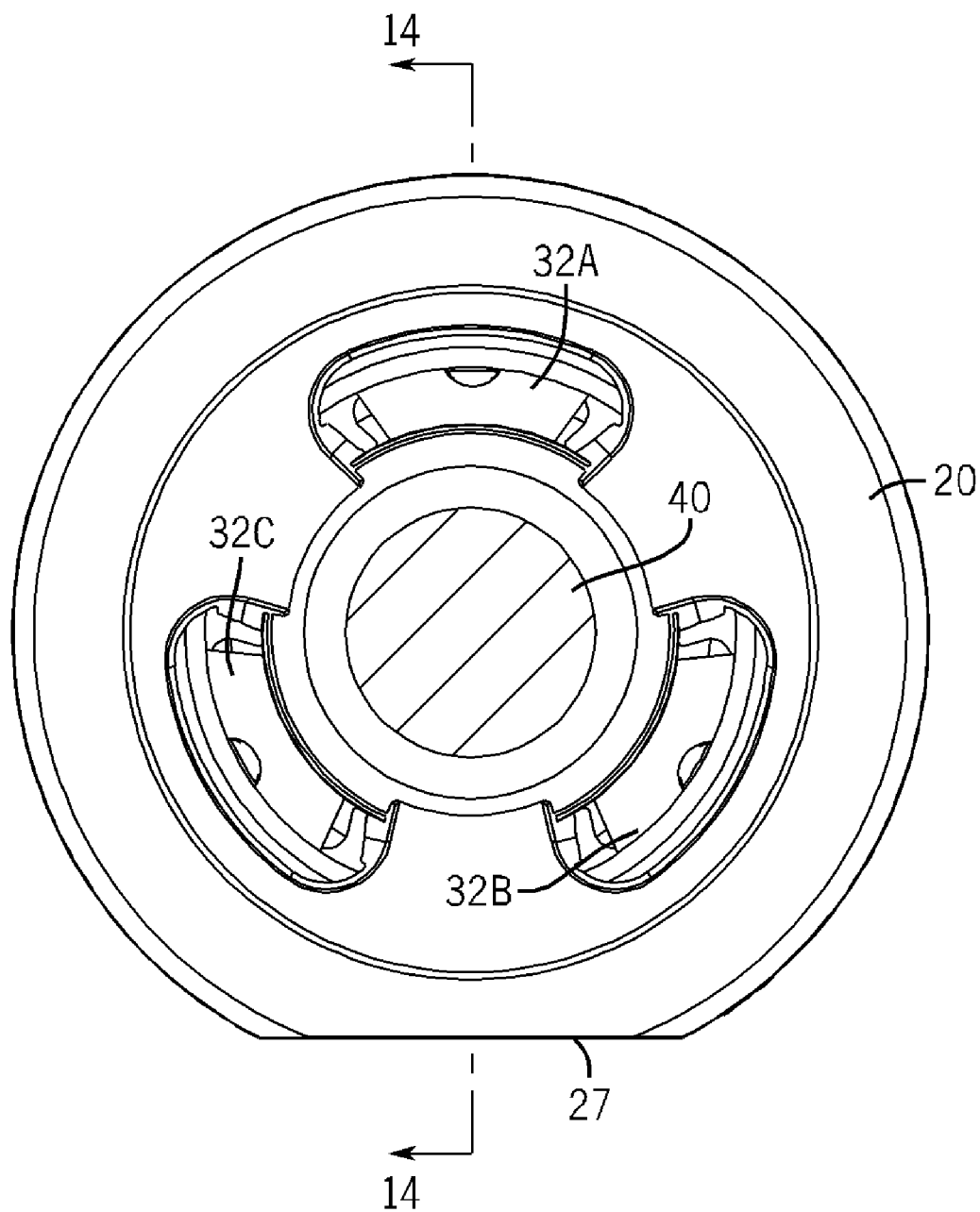
FIG. 10 is a top view of one embodiment of a push-in connector assembly in accordance with one embodiment of the present invention.
Figure 11:
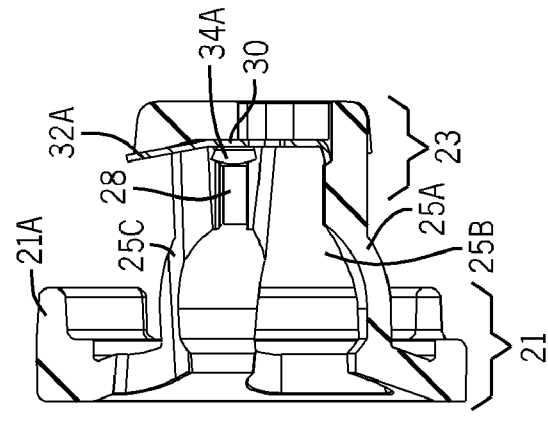
FIG. 11 is an exploded side view of a retainer clip and a connector in accordance with one embodiment of the present invention.

As best seen in FIGS. 3 and 11-13, in one embodiment the connector 20 has a top portion 21 into which a ball stud head 42 is inserted. As seen in FIGS. 1A and 3, the top portion 21 is shaped to allow the three wings 32A, 32B and 32C of the retainer clip 30 to pass through for insertion into the bottom portion 23 of the connector 20. As seen in FIGS. 1A, 2A and 10, the generally circular top portion 21 of this embodiment may include a flat edge 27. The flat edge 27 may be used to orientate the connector 20 during assembly of the connector assembly 10, or to aid in orientation during assembly into a boss 50. However, the flat edge 27 is an optional feature, and the top portion 21 may also be a complete circle (or other alternate shape such as a square). Top portion 21 also includes a flange 21A to surrounds the outside of the boss 50 to secure the top of the connector 20 to the boss 50 while allowing clearance for the legs 25A, 25B, 25C to expand inside the boss hole 52 as the ball stud 40 is installed into the connector 20. It also has a generally circular bottom portion 23 which is inserted into a generally circular reflector boss 50. However, the shape of the bottom portion of the 23 of the connector 20 could be modified to fit into bosses of different shapes, e.g. square-shaped bosses. Bottom portion 23 also includes a concave support surface which, when inserted into boss 50, also angles and supports the wings 32A, 32B, 32C to resist buckling if pull out is attempted. In the embodiment shown, socket 20 includes three legs 25A, 25B, 25C connecting the top portion 21 and bottom portion 23 of the connector 20. The legs 25A, 25B, 25C may be curved outward near the top portion 21 of the connector 20 to allow movement of the ball stud head 42 once inserted into the connector 20. Connector 20 is preferably made of a plastic material, such as Acetal, but other materials could be used.

Figure 4:
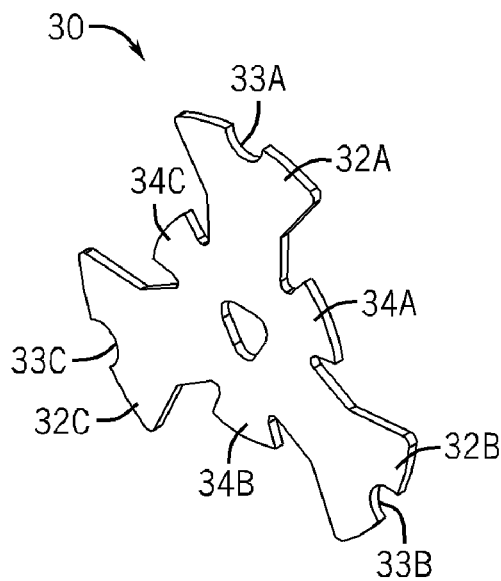
FIG. 4 is a perspective view of one embodiment of a retainer clip in a flat position in accordance with one embodiment of the present invention.
Figure 5:
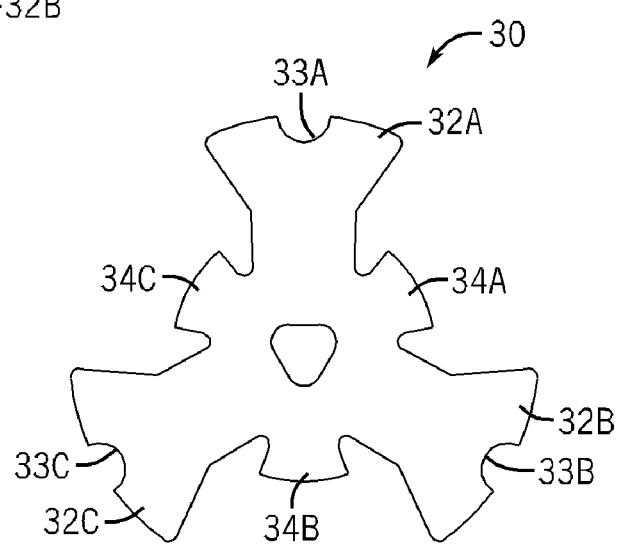
FIG. 5 is a front view of one embodiment of a retainer clip in a flat position in accordance with one embodiment of the present invention.
Figure 6:
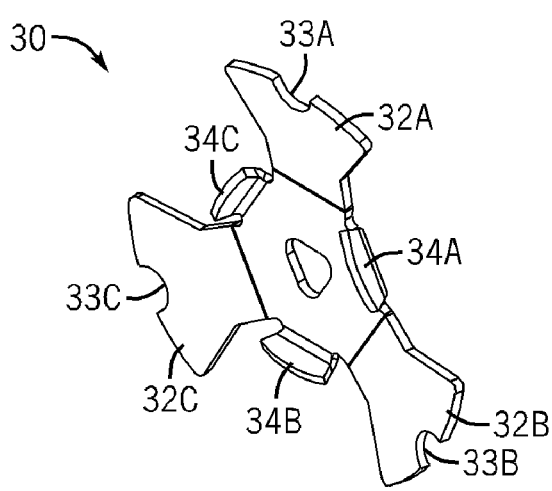
FIG. 6 is a perspective view of one embodiment of a retainer clip in a flexed position in accordance with one embodiment of the present invention.

As seen in the embodiment shown in FIGS. 4-6, retainer clip 30 is a symmetrical design and includes three outer wings 32A, 32B, 32C and three inner tabs 34A, 34B, 34C. As seen in FIGS. 4 and 5, clip 30 is stamped as a single, flat piece, which is cost-effective and saves time in the manufacturing of the push-in connector assembly 10. Additionally, the clip 30 can be placed into the connector 20 in any direction—that is, the there is no "face up" or "face down" distinction or specific rotational orientation necessary for clip 320 insertion. This saves time in the assembly process, as the person or machine assembling the push-in connector assembly 10 does not have to ensure that the clip 30 is facing a particular way for installation into the connector 20. Retainer clip 30 is generally made of a semi-rigid metal—fully hardened 301 stainless steel has been found effective but other materials could also be used. This allows for bending or flexion of the wings 32A, 32B, 32C and tabs 34A, 34B, 34C when the clip 30 is inserted into the connector 20 (as seen in FIG. 6). The wings 32A, 32B, 32C of the clip 30 may also each include a semicircular notch 33A, 33B, 33C, the sharp corners of which act to bite into the side walls of the boss 50 when the connector assembly is 10 is assembled into the boss 50. Other notch 33A, 33B, 33C shapes could be used to provide the "biting" effect, such as square or triangular shapes, and each wing 32A, 32B, 32C may include multiple notches 33A, 33B, 33C.

Figure 7:
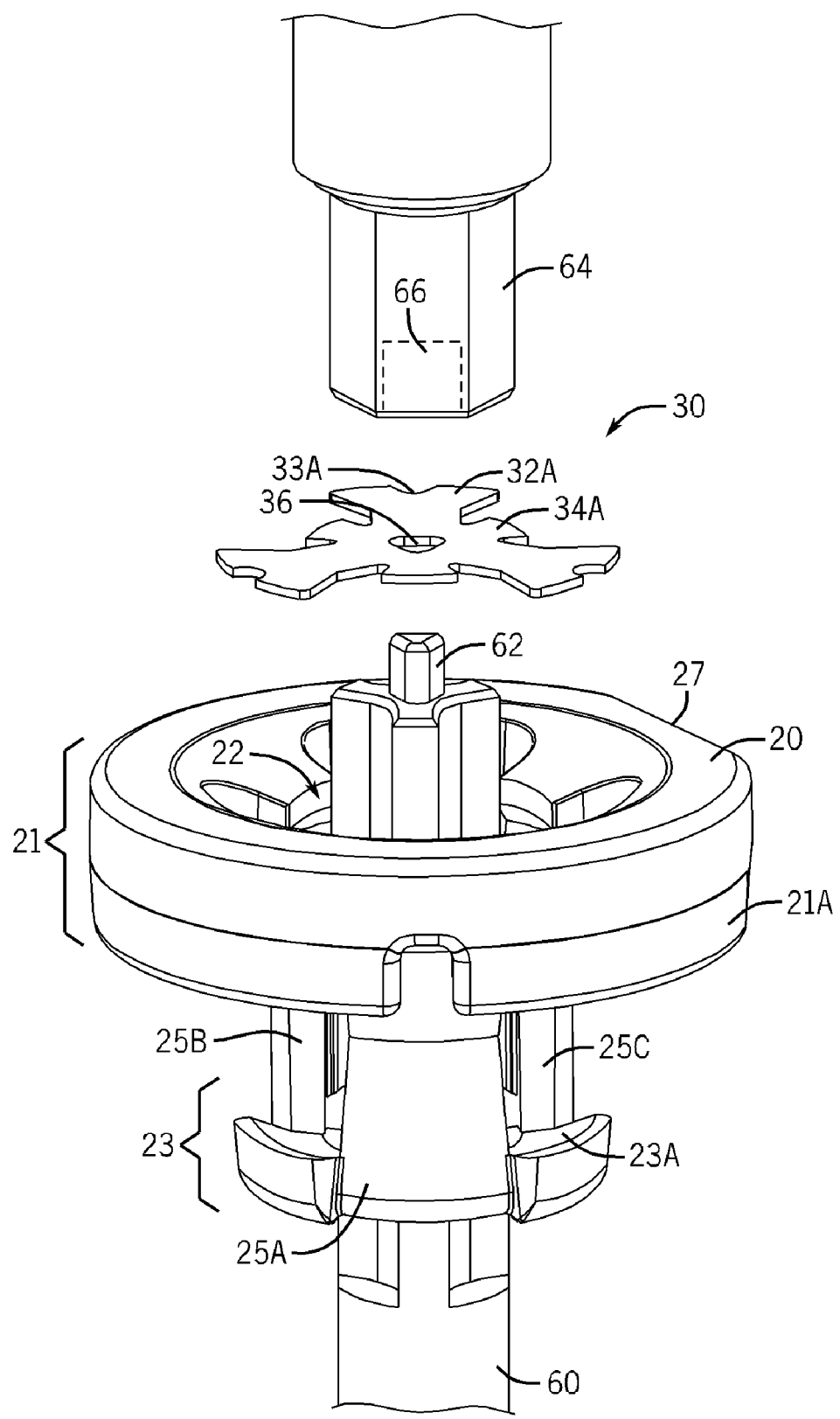
FIG. 7 is an exploded side view showing assembly of a retainer clip into a connector in accordance with one embodiment of the present invention.
Figure 8:
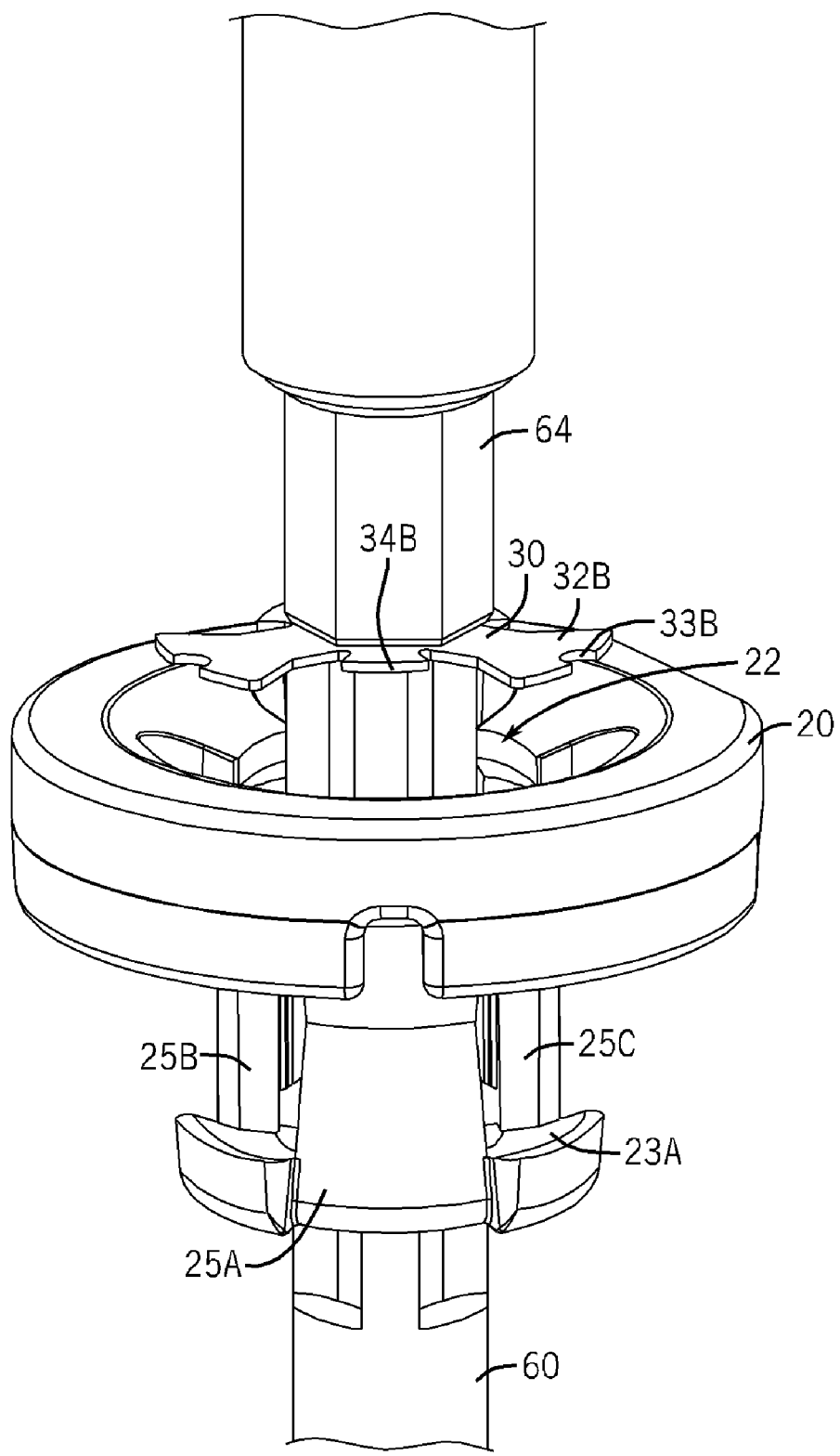
FIG. 8 is a side view showing assembly of a retainer clip into a connector in accordance with one embodiment of the present invention.
Figure 9:
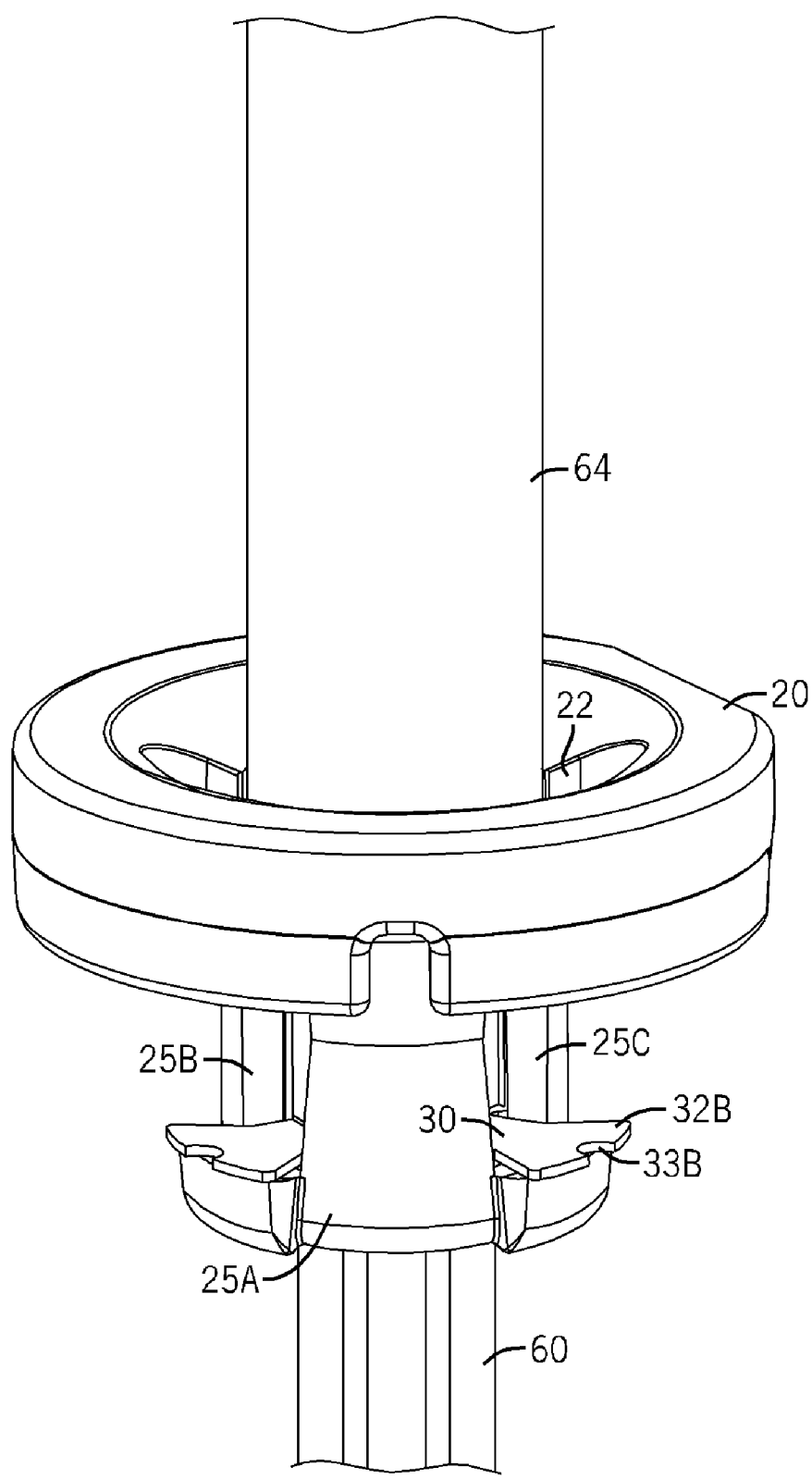
FIG. 9 is a side view showing assembly of a retainer clip into a connector in accordance with one embodiment of the present invention.

The embodiment shown in FIGS. 7-9 shows one method to assemble the clip 30 into the connector 20. A guide pin 60 is first inserted through the chamber 22 of the connector 20. Guide pin 60 has a triangular-shaped post 62 on the top end of the guide pin 60. Retainer clip 30 is then mounted onto the guide pin 60 by fitting a triangular-shaped hole 36 over the post 62. A push pin 64 with a triangular-shaped recess 66 matching the shape of the post is pushed onto the guide pin 60 and clip 30, sandwiching the clip 30 between the guide pin 60 and push pin 64 as seen in FIG. 8. The joined guide pin 60 and push pin 64 then continue to travel down the chamber 22 of the connector 20 and seat the clip 30 into the bottom portion 23 of the connector 20 (FIG. 9). As the clip 30 is seated into the connector 20, the tabs 34A, 34B, 34C are bent up as they contact the inside surface of connector legs 25A, 25B, 25C, then hook behind ledges 28. The guide pin 60 and push pin 64 are then removed from the connector assembly 10. The ledges 28 of each socket leg 25A, 25B, 25C hold the clip 30 securely into the connector 20 and prevent it from becoming dislodged. When the clip 30 is fully seated, the concave support surface 23A in the bottom portion 23 of the connector 20 angles the outer wings 32A, 32B, 32C slightly upward. A low insertion force of the connector assembly 10 into a boss 50 is allowed since the tabs 34A, 34B, 34C hold the inner portion of the clip 30 secure and allow the outer edge of wings 32A, 32B, 32C to flex upward unrestricted. Further, if pull out is attempted the outer edges 33A, 33B, 33C of wings 32A, 32B, 32C bite into the side wall of hole 52 of boss 50 and concave support surface 23A supports the wings 32A, 32B, 32C to resist buckling. The result of this combination is a high pull out resistance typically in excess of 450 N. While current connectors which utilize metal retainer clips require air cylinders or power screw drivers with a screw-mounted connector design to install the clip, the connector assembly 10 of the present invention allows the option of hand assembly. Additionally, the assembly process that bends the clip 30 upon being seated into the connector 20 allows the clip 30 to be manufactured in the flat shape described above. As a result, bend angles of the clip 30 do not need to be controlled, oriented or measured. The flat-stamped clip 30 component saves time and cost in the manufacturing of the push-in connector assembly 10.

Figure 12:
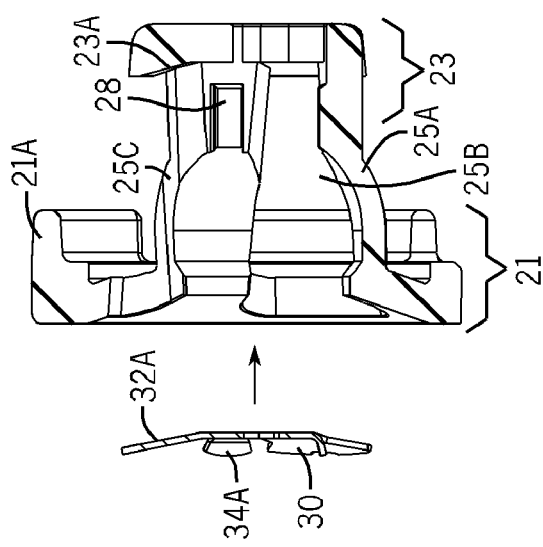
FIG. 12 is an exploded side view of a retainer clip, as connector and a ball stud in accordance with one embodiment of the present invention.

The flexion of the clip 30 upon insertion into the connector 20 is also advantageous for the insertion of the connector assembly 10 into a boss 50. As seen in FIG. 12, after the clip 30 has been inserted into the connector 20 and the clip 30 is in a flexed position, the wings 32A, 32B, 32C are also bent upwards. As seen best in FIG. 14, when the connector 20 is inserted into the hole 52 of the boss 50, the wings 32A, 32B, 32C are able to flex further to more vertical position as they bite into the inner walls of the boss 50. The semicircular notches 33A, 33B, 33C in the wings 32A, 32B, 32C provide sharp corners which act to indent or "bite" into the side walls of the boss 50 if removal of the connector assembly is 10 is attempted after it is assembled into the boss 50. The wings 32A, 32B, 32C thus fit securely against the walls of the hole 52 in the boss 50, while still allowing insertion of the connector 20 with a relatively small amount of push-in force required.

Figure 3A:
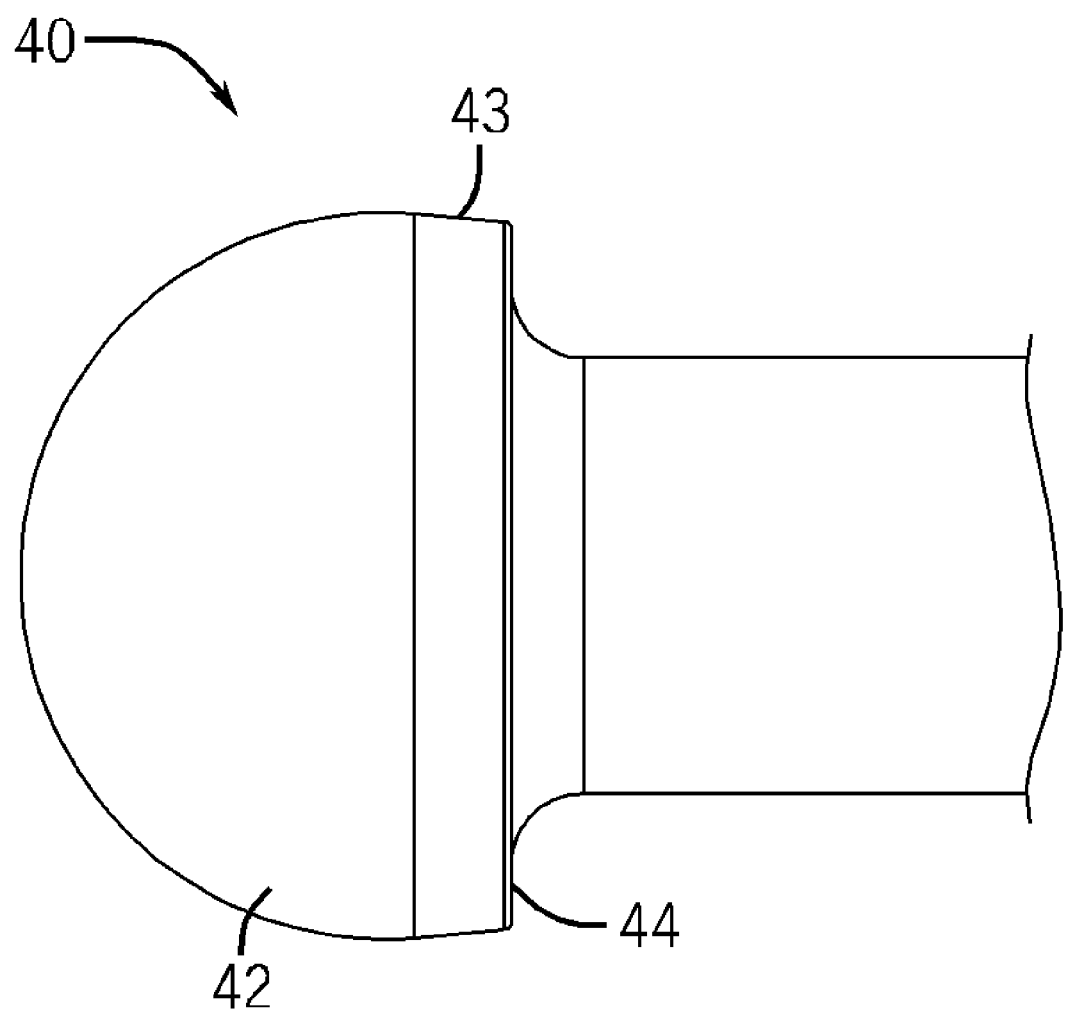
FIG. 3A is a detail side view of a ball stud in accordance with one embodiment of the present invention.

In the embodiment shown in FIGS. 1-14, assembly of the ball stud 40 into the connector 20 can done in several ways. In the example where the connector 20 is used in the headlamp assembly application, in the traditional manner connectors 10 are first installed into reflector bosses, and the reflector is then mounted to the ball studs within the headlamp assembly. Alternatively, as shown in FIGS. 11-14, the ball stud 40 can first be inserted into the connector 20, and then the entire socket assembly 10 (with ball stud 40) inserted into the boss 50. As best seen in FIGS. 3A and 13, the lip 44 on the head 42 of the ball stud 40 can be designed such that the diameter of the outer edge of the lip 44 interferes and acts as a spring-centering or biasing feature against the angled surface on the undercut portion 24 of the connector 20. This biasing holds the axis of the connector 20 in line with the axis of the ball stud 40, allowing the connector 20 to maintain the proper alignment when it is inserted into the boss 50 after being pre-assembled on the ball stud 40. Such an assembly method opens the possibility to reduce overall assembly costs for the headlamp assembler because it eliminates the assembly station normally needed for the reflector in order to pre-install the connectors. The flange 21A that surrounds the outside of the boss 50 secures the top portion 21 to the outside of the boss 50 and allows clearance for the legs 25A, 25B, 25C to expand inside the boss hole 52 as the ball stud 40 is installed into the connector 20.

The use of the retainer clip 30 to secure the connector 20 into the boss 50 and the angled position of the clip 30 that results from insertion of the clip 30 into the connector 20 and the connector 20 into the boss 50 also provides an additional advantage to the present invention. Unlike existing connector designs, the present invention allows the outer edge of the retainer clip 30 to easily flex upward for low installation force yet fully supports the retainer clip in the other direction clip to prevent pull out and secure the connector 20 into the hole 52 of the boss 50. Existing designs provide for screw-mounted connectors (which require additional installation time and cost), or retainer clips that cannot easily flex during installation and scrape against the inner walls of the boss during insertion, and therefore require a very high push-in force. Furthermore, existing non-screw-mounted designs provide for connectors which are snap-fit into bosses, which require through holes for mounting that are not desired for the manufacturing reason previously mentioned. A push-in connector assembly 10 in accordance with the present invention includes a metal retainer clip 30 that freely bends in one direction for easy installation, yet is fully supported from flexing in the other direction for a secure fit and to prevent accidental pull-out from a boss 50. Unlike existing designs, the connector assembly 10 of the present invention can be both hand-assembled while providing significant resistance to accidental pull out. Another advantage to the push-in connector assembly 10 of the present invention is that the overall depth of the connector 20 is minimized by design and smaller in overall length than existing connector assemblies. In the headlamp assembly application, the combination of having the retainer clip adjacent and just in front of ball stud and the concave support surface adjacent and just in front of the clip minimizes the fore/aft depth stack up from the pivot. This provides an advantage since the fore/aft depth of the connector 20 directly affects overall depth of the headlamp and the depth of the headlamp often needs to be minimized to accommodate desired styling, optics and other components. Another advantage of the connector assembly 10 is that the molded connector 20 can be made in a two-plate mold that requires no side action. This reduces tooling cost and maintenance in the molding of the part.

In alternative embodiments, shown in FIGS. 15-29, the connector assembly 10 is designed to provide for use of the connector assembly 10 in applications other than as a socket for receiving a ball stud 40. The assembly of the retainer clip 30 into the connector 20 and the connector assembly 10 into a boss 50 would be done in substantially the same way. However, in alternative embodiments, a ball stud 40 could engage with the connector assembly 10 in a different way for adjustment of a reflector of a headlamp assembly, or the connector assembly 10 could be used to support or connect other various items to any object having a boss 50.

Figure 15:
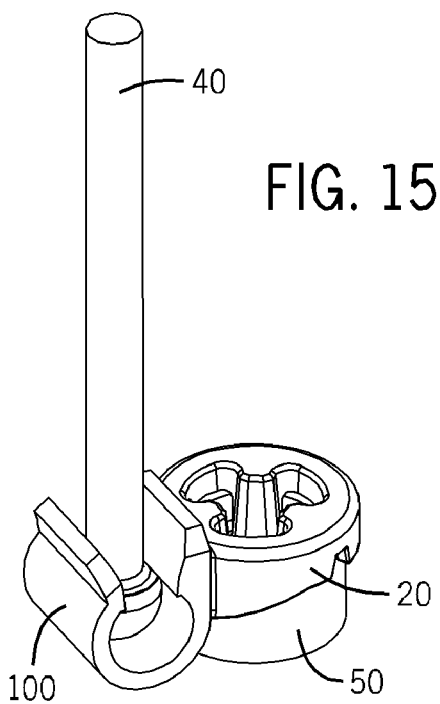
FIG. 15 is a perspective view of a push-in connector assembly in accordance with another embodiment of the present invention.
Figure 16:
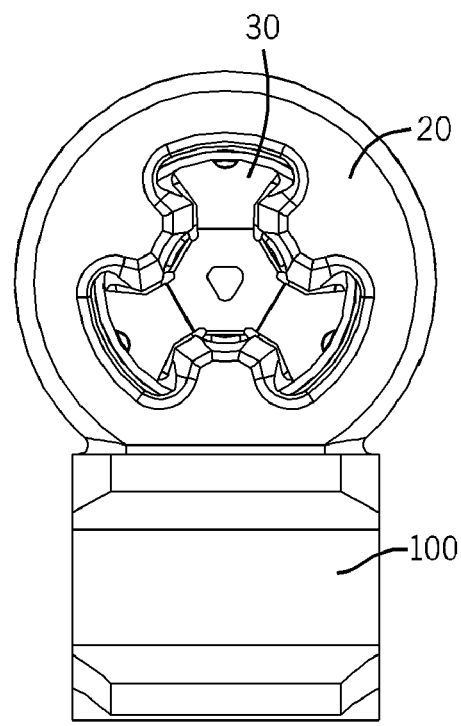
FIG. 16 is a top view of the push-in connector assembly in FIG. 15 (shown without a ball stud in the connector)
Figure 17:
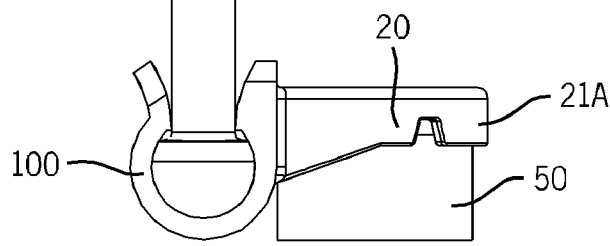
FIG. 17 is a side view of the push-in connector assembly in FIG. 15 (shown without a ball stud in the connector)

In one alternative embodiment, shown in FIGS. 15-17, the connector assembly 10 includes a ball track 100 adjoining the top portion 21 of the connector 20. In headlamp assembly applications, the use of a ball track 100 is an alternative to the configuration where the connector 20 itself acts as the socket cup for a ball stud 40, as shown in the embodiment in FIGS. 1-14. As seen in FIG. 17, connector assembly 10 is pushed into a boss 50, either with a ball stud 40 already inserted into the ball track 100, or, alternatively, the ball stud 40 is inserted into the ball track 100 after insertion of the connector assembly 10 into a boss 50. As seen best in FIG. 16, the top portion 21 of the connector 20 is configured so as to eliminate the undercut portion 24 for holding a ball stud 40 in place, as this embodiment does not receive a ball stud 40 into the top portion 21 and chamber 22 of the connector 20.

Figure 18:
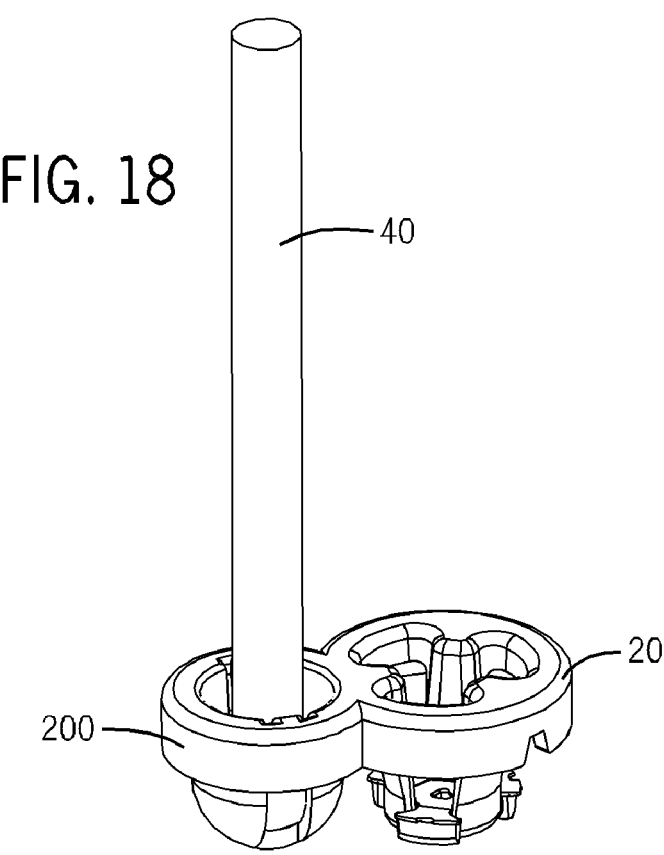
FIG. 18 is a perspective view of a push-in connector assembly in accordance with yet another embodiment of the present invention.
Figure 19:
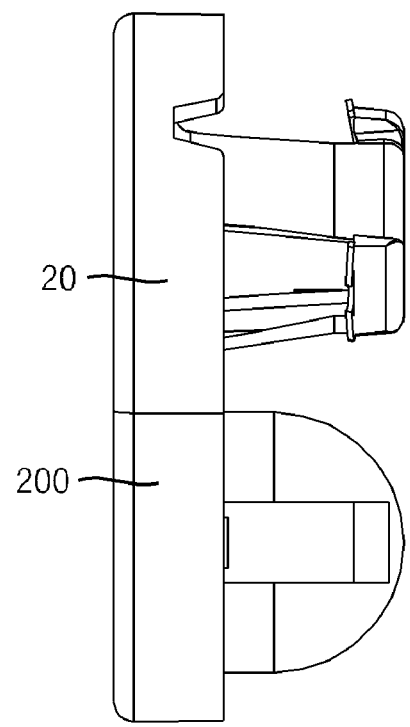
FIG. 19 is a side view of the push-in connector assembly in FIG. 18 (shown without a ball stud in the connector)
Figure 20:
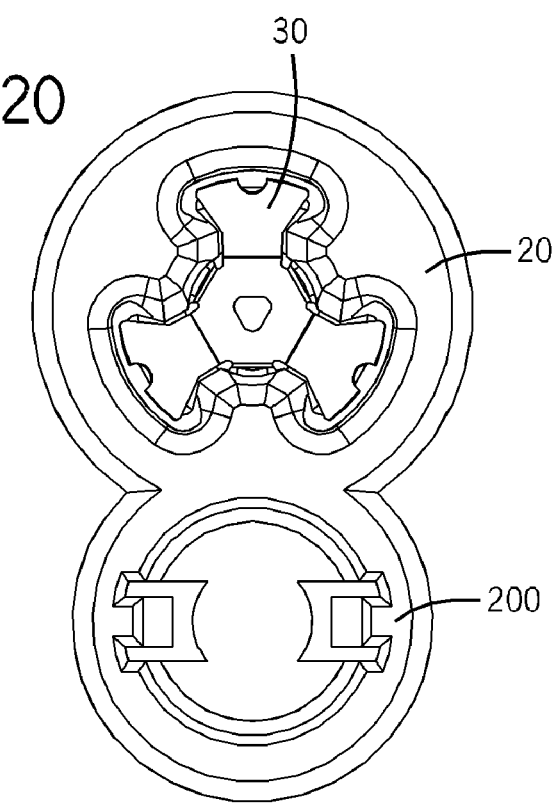
FIG. 20 is a top view of the push-in connector assembly in FIG. 18 (shown without a ball stud in the connector)

In another embodiment, shown in FIGS. 18-20, a connector assembly 10 includes a socket cup 200 adjoining the top portion 21 of the connector 20. In headlamp assembly applications, the socket cup 200 is configured to accept various types of ball studs 40 for adjustment of a headlamp reflector. The use of a socket cup 200 adjoining the connector assembly 10 is an alternative to the configuration where the connector 20 itself acts at the socket cup for a ball stud 40, as shown in the embodiment in FIGS. 1-14. Connector assembly 10 could be pushed into a boss 50, either with a ball stud 40 already inserted into the socket cup 200, or, alternatively, the ball stud 40 could be inserted into the socket cup 200 after insertion of the connector assembly 10 into a boss 50.

Figure 21:
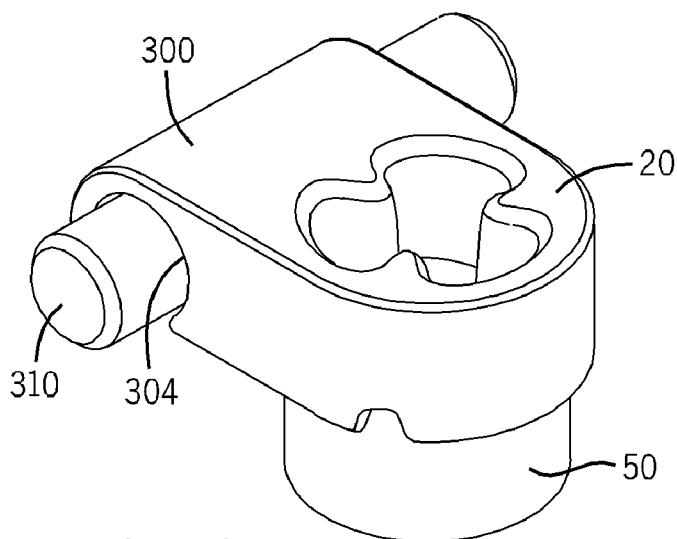
FIG. 21 is a perspective view of a push-in connector assembly in accordance with yet another embodiment of the present invention.
Figure 22:
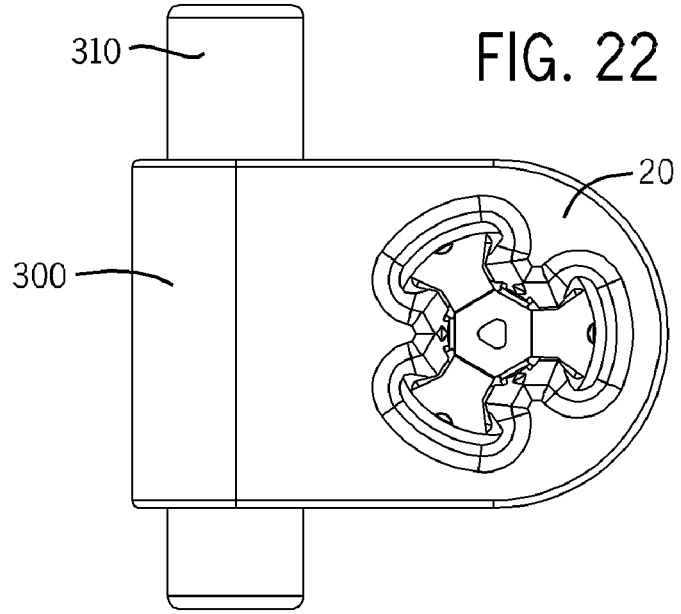
FIG. 22 is a top view of the push-in connector assembly in FIG. 21.
Figure 23:
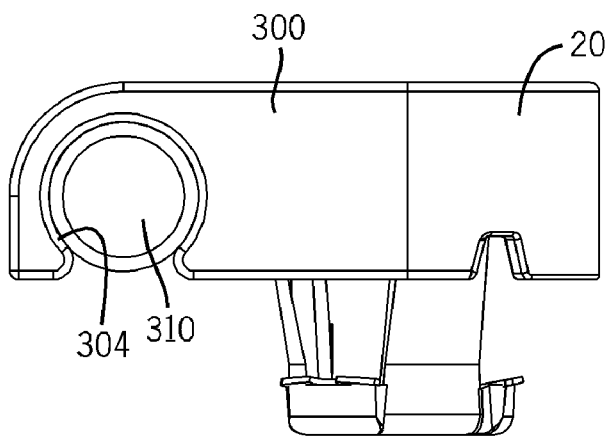
FIG. 23 is a side view of the push-in connector assembly in FIG. 21.
Figure 24:
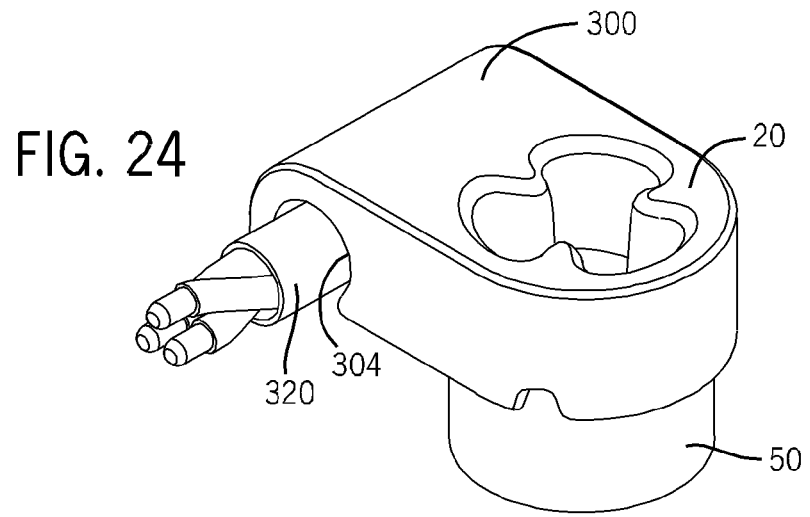
FIG. 24 is a perspective view of a push-in connector assembly in accordance with yet another embodiment of the present invention.
Figure 25:
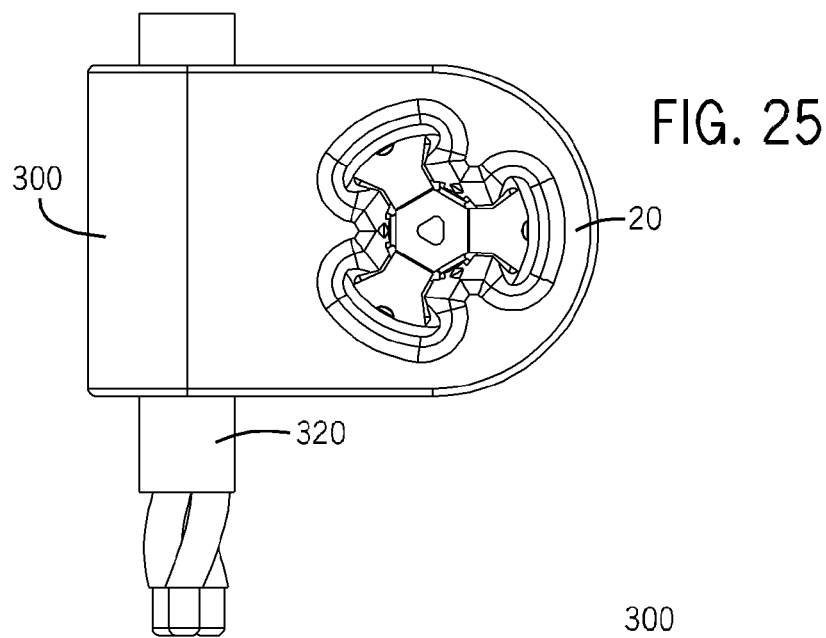
FIG. 25 is a top view of the push-in connector assembly in FIG. 24.
Figure 26:
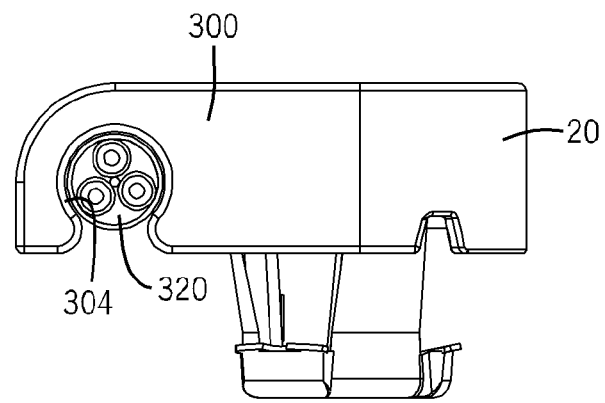
FIG. 26 is a side view of the push-in connector assembly in FIG. 24.

In another embodiment, shown in FIGS. 21-23, the top portion 21 of the connector 20 is configured to include one or more arms 300 for supporting a shaft 310 of an object. A connector assembly 10 according to this embodiment could be used to secure a variety of different objects having shafts 310 to any variety of bases containing a boss 50. Another contemplated embodiment, shown in FIGS. 24-26, provides an arm 300 for supporting a wire or group of wires 320. The slot 304 of the arm could be configured in size and/or shape to receive shafts 310 of various objects or varying thicknesses and numbers of wires 320. For example, the slot 304 could be designed to be completely enclosed around the shaft 310 or wires 320, or could be designed to be a square or other shape. In addition, the connector assembly 10 could have multiple arms 300 to secure multiple shafts 310 or multiple wires/groups of wires 320.

Figure 27:
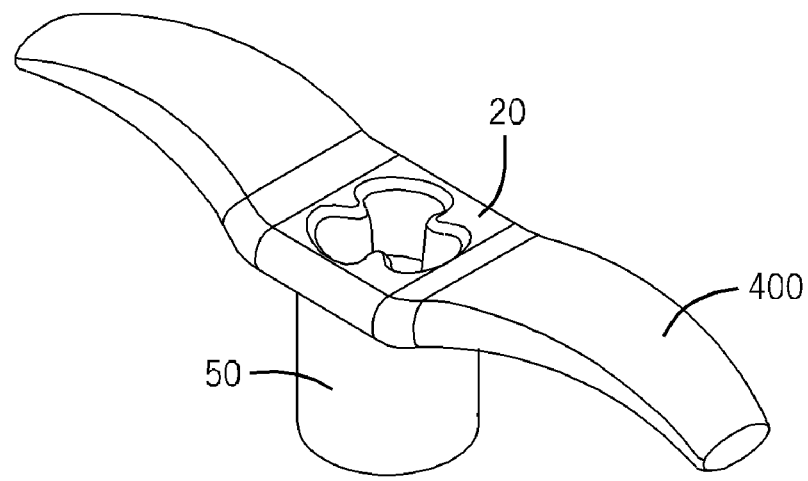
FIG. 27 is a perspective view of a push-in connector assembly in accordance with yet another embodiment of the present invention.
Figure 28:
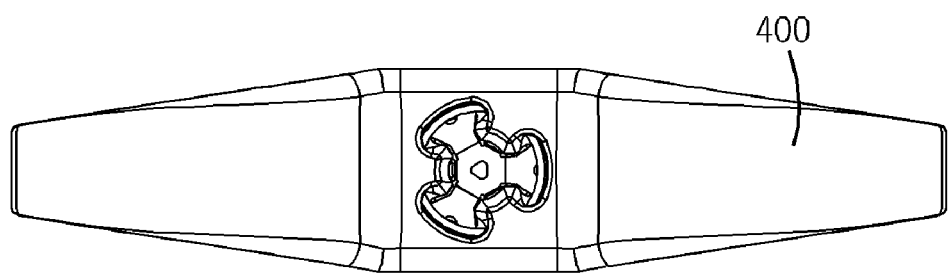
FIG. 28 is a top view of the push-in connector assembly in FIG. 27.
Figure 29:
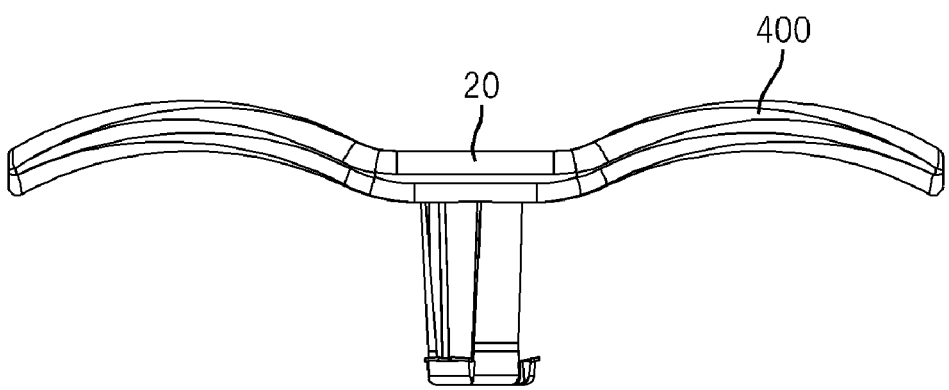
FIG. 29 is a side view of the push-in connector assembly in FIG. 27.

In yet another embodiment, shown in FIGS. 27-29, top portion 21 of connector 20 may include one or more flanges 400. The integration of flanges 400 to the connector 20 form a type of handle, such that when the connector assembly 10 is fit into a boss 50, the connector assembly 10 serves as a means of lifting, removing or adjusting the base object in which the boss 50 is located. The number of flanges 400 could vary, as could the size and shape of each flange 400.

Figure 30:
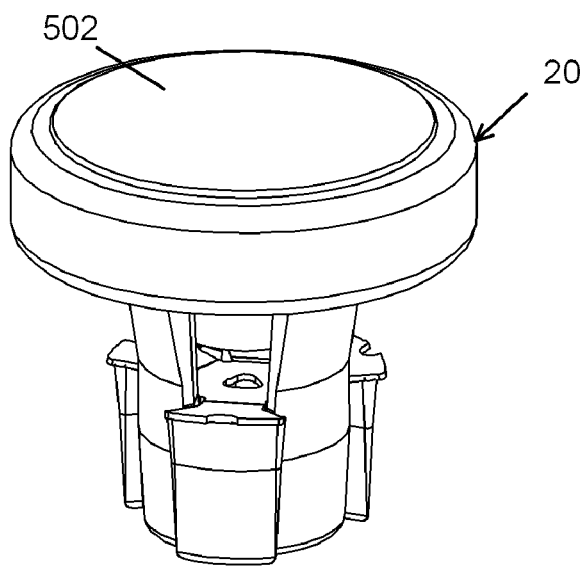
FIG. 30 is a perspective view of a push-in connector assembly in accordance with yet another embodiment of the present invention.
Figure 31:
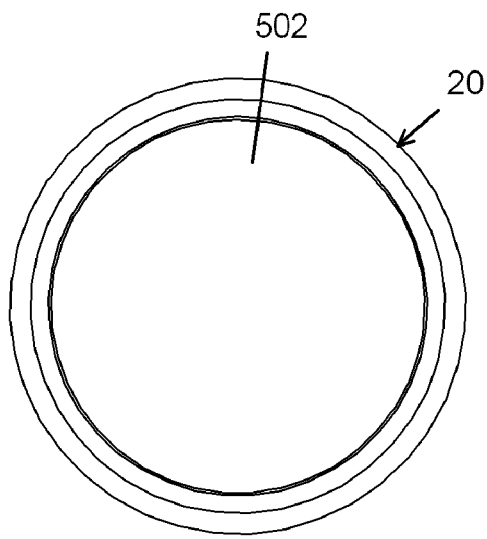
FIG. 31 is a top view of the push-in connector assembly in FIG. 30.
Figure 32:
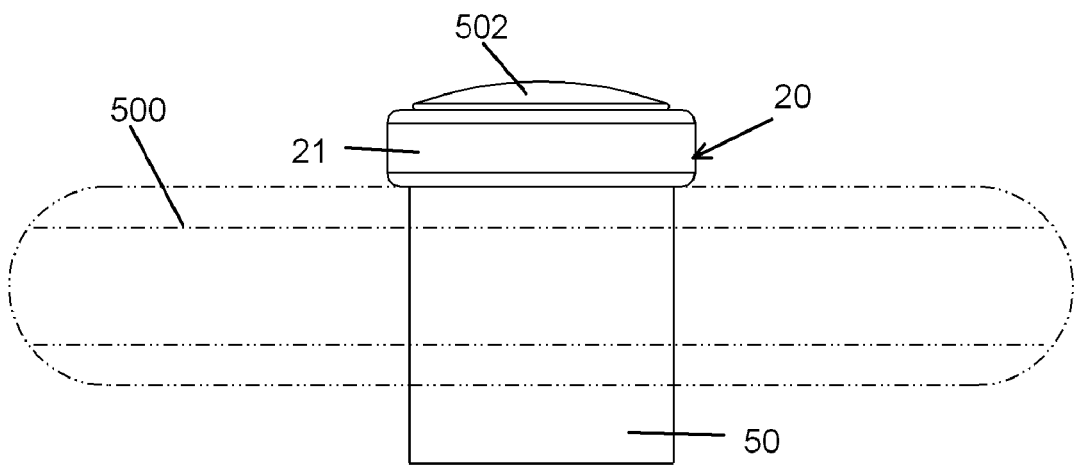
FIG. 32 is a side view of the push-in connector assembly in FIG. 30 (shown with an object secured by the push-in connector assembly).

In yet another alternative embodiment, shown in FIGS. 30-32, connector 20 is used as a fastener to secure an object 500 (shown in phantom in FIG. 32) in place. This embodiment has a configuration similar to that of the other embodiments except that a decorative cap 502 is used to cover the chamber 22. Connector 20 is inserted into a boss 50, which may be a wheel axle or other hollow shaft, to secure an object 500 placed on the boss 50, such as a wheel, in place. As seen in FIG. 32, the diameter of the top portion 21 of the connector 20 is larger than the diameter of the opening of the object 500, allowing the object 500 to be secured to the boss 50 by the connector 20. A decorative cap 502 may be placed inside the chamber 22 of the connector 20, and may be made of a variety of materials so as to coordinate with a variety of objects 500. The decorative cap 502 is press-fit into the chamber 22 of the connector 20 and held in place by friction. Other means of attachment, e.g., snap-fitting, gluing or sonic welding, could be used. A decorative cap 502 could be used in connection with other embodiments previously described such as the handle (FIGS. 27-29) or wire guide (FIGS. 24-26). Conventional fasteners, which may fit over a solid or hollow shaft or into a hollow shaft, require high installation force and are not easily hand-assembled. The connector assembly 10 of the present invention can be hand-assembled while also providing a high pull-out resistance to securely fasten the object 500 to the boss 50.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A connector assembly comprising:
   a connector having a bottom portion with a plurality of substantially parallel legs extending therefrom, the plurality of legs defining at least one slot therebetween and having inner and outer faces, said inner faced defining a chamber within the connector;
   a retainer clip inserted into the chamber of the connector, comprising: a planar body, at least one tab extending radially from the body and positively engaging the chamber of the connector securing the retained clip within the connector, and at least one wing, wherein the at least one wing extends radially from the body and through the at least one slot beyond the outer faces such that the at least one wing is shaped to grip a surface surrounding the connector.

2. The connector assembly of claim 1 wherein the at least one wing includes at least one notch disposed at a distal end thereof.

3. The connector assembly of claim 2 wherein the at least one notch includes at least one sharp edge for gripping a surface surrounding the connector.

4. The connector assembly of claim 1 wherein the plurality of legs further include ledges under which the at least one tab of the retainer clip can be snap-fit for securing the retainer clip to the connector.

5. The connector assembly of claim 1 wherein the body of the retainer clip has a top planar surface and a bottom planar surface, and wherein the tabs and wings are canted from the body toward the top planar surface and away from the bottom planar surface.

6. The connector assembly of claim 1 wherein the connector further includes a top portion connected to the bottom portion by the plurality of legs.

7. The connector assembly of claim 1 wherein the chamber is formed to accept a ball stud.

8. The connector assembly of claim 1 wherein the top portion of the connector further includes an adjoining ball track for receiving a ball stud.

9. The connector assembly of claim 1 wherein the top portion of the connector further includes an adjoining socket cup for receiving a ball stud.

10. The connector assembly of claim 1 wherein the top portion of the connector further includes an arm for supporting a shaft.

11. The connector assembly of claim 1 wherein the top portion of the connector further includes an arm for supporting one or more wires.

12. The connector assembly of claim 1 wherein the top portion of the connector further includes one or more flanges forming a handle on the top portion of the connector.

13. The connector assembly of claim 1 further including a cap which is inserted into the top portion of the connector.

* * * * *

UNITED STATES PATENT AND TRADEMARK OFFICE
CERTIFICATE OF CORRECTION

PATENT NO.       : 7,963,715 B2
APPLICATION NO.  : 12/114591
DATED            : June 21, 2011
INVENTOR(S)      : Burton It is certified that error appears in the above-identified patent and that said Letters Patent is hereby corrected as shown below:

In the claims
Column 9,
Line 40, Claim 1, the word "retained" should be deleted and replaced with the word --retainer--

Signed and Sealed this
Eleventh Day of October, 2011

David J. Kappos
*Director of the United States Patent and Trademark Office*